United States Patent
Yamazaki et al.

(10) Patent No.: US 7,315,955 B2
(45) Date of Patent: Jan. 1, 2008

(54) CIRCUIT FOR TURNING OFF CHARGING FUNCTION TO A BATTERY OF A SYSTEM BASED ON INFORMATION SET BY USER DURING THE SYSTEM IN POWER-OFF STATE

(75) Inventors: Mitsuhiro Yamazaki, Yokohama (JP);
Shinji Matsushima, Yokohama (JP);
Hideshi Tsukamoto, Machida (JP);
Takayuki Katoh, Yokohama (JP);
Mitsuo Tabo, Fujisawa (JP)

(73) Assignee: Lenovo Singapore Pte, Ltd., Singapore (SG)

( * ) Notice: Subject to any disclaimer, the term of this patent is extended or adjusted under 35 U.S.C. 154(b) by 854 days.

(21) Appl. No.: 10/730,326

(22) Filed: Dec. 8, 2003

(65) Prior Publication Data
US 2004/0148531 A1    Jul. 29, 2004

(30) Foreign Application Priority Data
Dec. 11, 2002    (JP) ............................. 2002-359826

(51) Int. Cl.
*G06F 1/26*    (2006.01)
(52) U.S. Cl. ...................... 713/340; 320/155
(58) Field of Classification Search ............... 713/300, 713/340; 320/155
See application file for complete search history.

(56) References Cited

U.S. PATENT DOCUMENTS

| 6,657,415 B2 * | 12/2003 | Saeki et al. ................. 320/125 |
| 6,928,568 B2 * | 8/2005 | Breen et al. ................ 713/340 |
| 7,003,679 B1 * | 2/2006 | Lesea et al. ................ 713/300 |

FOREIGN PATENT DOCUMENTS

| JP | 11-187665 | 7/1999 |
| JP | 2000-122756 | 4/2000 |
| JP | 2000-137684 | 5/2000 |
| JP | 2002-351585 | 12/2002 |

* cited by examiner

*Primary Examiner*—Thuan Du
(74) *Attorney, Agent, or Firm*—Dillon and Yudell; Carlos Munoz-Bustamante (57) ABSTRACT

A power supply circuit for a computer system includes an AC adapter designed to be connectable to the computer system and supplying power to the system, a main battery and a second battery that are designed to be connectable to the computer system and get charged with power from the AC adapter and then discharge it to supply power to the system, a charger that is a charging circuit for the main battery and/or the second battery while the main battery and/or the second battery is connected to the AC adapter with the computer system powered off, and a gate array circuit for turning off the power supply to an embedded controller.

10 Claims, 8 Drawing Sheets

CIRCUIT FOR TURNING OFF CHARGING FUNCTION TO A BATTERY OF A SYSTEM BASED ON INFORMATION SET BY USER DURING THE SYSTEM IN POWER-OFF STATE

FIELD AND BACKGROUND OF INVENTION

The present invention relates to a computer and the like, and more particularly, to a computer and the like that has capability of reducing power consumption.

It is increasingly desirable from a standpoint of environmental issues today to reduce electrical power consumed during system power-off in a computer, especially, standby power when power is supplied by electrical power supply devices such as AC adapters. For example, a standard of Japan Environment Association (an incorporated foundation)'s Eco Mark (a trademark), established in the year 2000, stipulates that electrical power consumed during system power-off for a model including an AC adapter and no wakeup function should be 1W or less and that for a model with wakeup function be 5W or less. Wakeup function means a function to power on and start up a computer remote from a user, enabling a computer to be powered on with a direction from a network based on an operation at a remote place. A typical example of this function is WakeOnLAN, for example. The function allows powered-off computers to be managed in a centralized and collective manner.

In such a system, an active logic exists that consumes power at realization of wakeup function through communication even while the system is powered off. In case of WakeOnLAN, factors for this power consumption at wakeup include keeping a power supply VAUX ON for waking up a target Ethernet (a trademark) adapter so as to start up the PC upon recognizing a predetermined packet from a network. Due to such a factor, a system with wakeup function consumes more power during its power-off state than one without wakeup function.

Also, if an AC power supply exists in a system having a battery that can be used repeatedly through charging and discharging, a circuit required for battery charging function is always supplied with power even when the system is powered off (shut down). Such a circuit monitors battery state all the time for charging the battery, and consistently consumes about 100W if an AC power supply exists.

As a prior art relevant to reduction of power consumption, a technology exists that determines if charge of a backup capacitor is complete or not, and if complete, shuts off the power supply channel from the AC power supply in a power supply circuit having a backup capacitor for accumulating charging power (see, for example, Japanese Published Unexamined Patent Application No. 2000-4547 (pp3-4, FIG. 1).

In recent years, reduction of standby power for electrical products typified by computers especially has growing significance. As such, users who do not use functions relating to standby such as wakeup function also want to reduce standby power that is consumed during a state in which those functions relating to standby are enabled. However, modern systems do not provide interfaces for turning off charging function, for example. Additionally, a system which can be woken up is typically used with its wakeup function turned on, and reliable halt of the function requires complicated settings, thus limiting halt operation by a user.

On the other hand, although the technology disclosed in the Japanese Application mentioned above can indeed reduce power consumption during standby state when charging is not necessary, it just switches between connection and shut off of the AC power supply channel (primary) to a transformer within a device that internally includes a power supply. The technology thus cannot be applied to a device such as a notebook personal computer that does not internally include a power supply and has an external AC adapter for AC/DC conversion. Also, the technology does not control on/off of the function itself that is responsible for standby. As a result, while power consumption can be reduced when charging is not necessary, total power used for standby that is supplied by the capacitor remains the same, thus adversely more power is required when charging the capacitor, providing no reduction of overall power consumption.

SUMMARY OF THE INVENTION

With the foregoing in mind, this invention has been made to solve the technical challenges summarized above, and has a purpose of reducing power consumption during shutdown state in a computer having a battery.

Another purpose is to provide a state in which wakeup function and charging function are turned off so as to reduce power consumption during shutdown state.

Still another purpose is to provide a capability and a user interface for managing standby power during shutdown state so that settings including the use of standby function can be made.

With these purposes, while when especially an AC power supply exists in a shutdown state (system power-off state) of a notebook PC, for example, a circuit required for charging a battery is typically supplied with power all the time in prior arts, the invention reduces power consumed in a system during its shutdown state by turning off the power supply to such a circuit when charging function is not used. That is, a computer to which the invention is applied has a system (computer system, system unit); an AC power supply that is designed to be connectable to the system and supplies power to the system; a battery that is designed to be connectable to the system and gets charged with power from the AC power supply and then discharges it to supply power to the system; and a circuit that can turn off charging function to the battery while the battery and the AC power supply are connected with the system powered off.

The circuit that can turn off charging function is characterized in that, when the system is powered off during charging to the battery, it turns off charging function to the battery after the charging is complete. Also, the circuit that can turn off charging function can turn on (clear OFF) charging function to the battery when an AC power supply is connected after not being connected with the system powered off. Further, the circuit that can turn off charging function can turn on (clear OFF) charging function to the battery when a battery that has not been connected is connected with the system powered off. Further, the circuit that can turn off charging function can turn on charging function to the battery after a predetermined time period has passed with charging function to the battery turned off.

The computer may further comprise a regulator for supplying a small amount of power to the circuit that can turn off charging function with the system powered off. Also, the computer comprises a user interface for a user to set the charging function for when the system is in power-off state, and characterized in that the circuit that can turn off charging function turns off the charging function to the battery based on information set for the user interface.

Viewed in another way, the invention is a computer in which an AC power supply for supplying power to the system can be connected with a device having wakeup function to wake up the system, the computer comprising an auxiliary power supply for supplying power to a device that is connected to the system with the system powered off and the AC power supply connected; and a circuit for turning off the auxiliary power supply based on settings by a user. Here, it is preferable that the circuit is characterized in that it turns off the auxiliary power supply for WakeOnLAN function among auxiliary power supplies so that power reduction can be applied to a function that consumes especially large amount of power.

Meanwhile, the invention is a power management method in a computer having an AC power supply designed to be connectable to the system and supplying power to the system, and a battery that gets charged with power from the AC power supply and then discharges it to supply power to the system, comprising the steps of determining whether or not the battery is being charged with the system powered off; and turning off the power supply to a charging circuit for charging when the battery is not being charged even if the AC power supply is connected, and the method is characterized in that it turns on the charging circuit in response to elapse of a predetermined time period after the charging circuit is powered off.

The power management method in a computer to which the invention is applied comprises steps of turning off the power supply to the charging circuit for charging the battery with the system powered off; and shifting the power supply of the charging circuit from OFF to ON when an AC power supply is connected after not being connected.

Further, the power management method in a computer to which the invention is applied comprises steps of turning off the power supply to the charging circuit for charging the battery with the system powered off; and shifting the power supply of the charging circuit from OFF to ON when a battery requiring to be charged is connected to the system after not being connected.

Still further, the invention is a power management method in a computer to which an AC power supply and a battery can be connected and which can realize wakeup function, characterized in that an auxiliary power supply provided to wakeup function with the system powered off is turned on in response to the state an AC power supply is connected; the auxiliary power supply is turned off if an AC power supply is not connected and only a battery is connected; and the auxiliary power supply is turned off depending on settings even when an AC power supply is connected.

The invention can also be viewed as a program executed by a computer. That is, a program to which the invention is applied causes a computer to execute a function of determining whether or not a battery is being charged with a system powered off; a function of turning off the power supply for supplying power to a charging circuit for charging if the battery is not being charged even if an AC power supply is connected; turning on the power supply for providing power to the charging circuit when the AC power supply is connected after not being connected; turning on the power supply for providing power to the charging circuit when a battery requiring to be charged is connected after not being connected; and turning on the power supply in response to elapse of a predetermined time period after the power supply providing power to the charging circuit is turned off.

The program may be provided on a storage medium storing the computer-readable program to be executed by a computer. Such a medium includes CD-ROM media, for example, in that case the program is read by a CD-ROM drive in the computer and stored in flash ROM or the like in the computer to be executed. The program may also be provided to a computer via a network by a program transmission apparatus, for example.

BRIEF DESCRIPTION OF DRAWINGS

Some of the purposes of the invention having been stated, others will appear as the description proceeds, when taken in connection with the accompanying drawings, in which:

FIG. 6 is a flowchart illustrating shutdown processing executed by BIOS and the like;

DETAILED DESCRIPTION OF INVENTION

While the present invention will be described more fully hereinafter with reference to the accompanying drawings, in which a preferred embodiment of the present invention is shown, it is to be understood at the outset of the description which follows that persons of skill in the appropriate arts may modify the invention here described while still achieving the favorable results of the invention. Accordingly, the description which follows is to be understood as being a broad, teaching disclosure directed to persons of skill in the appropriate arts, and not as limiting upon the present invention.

Figure 1:
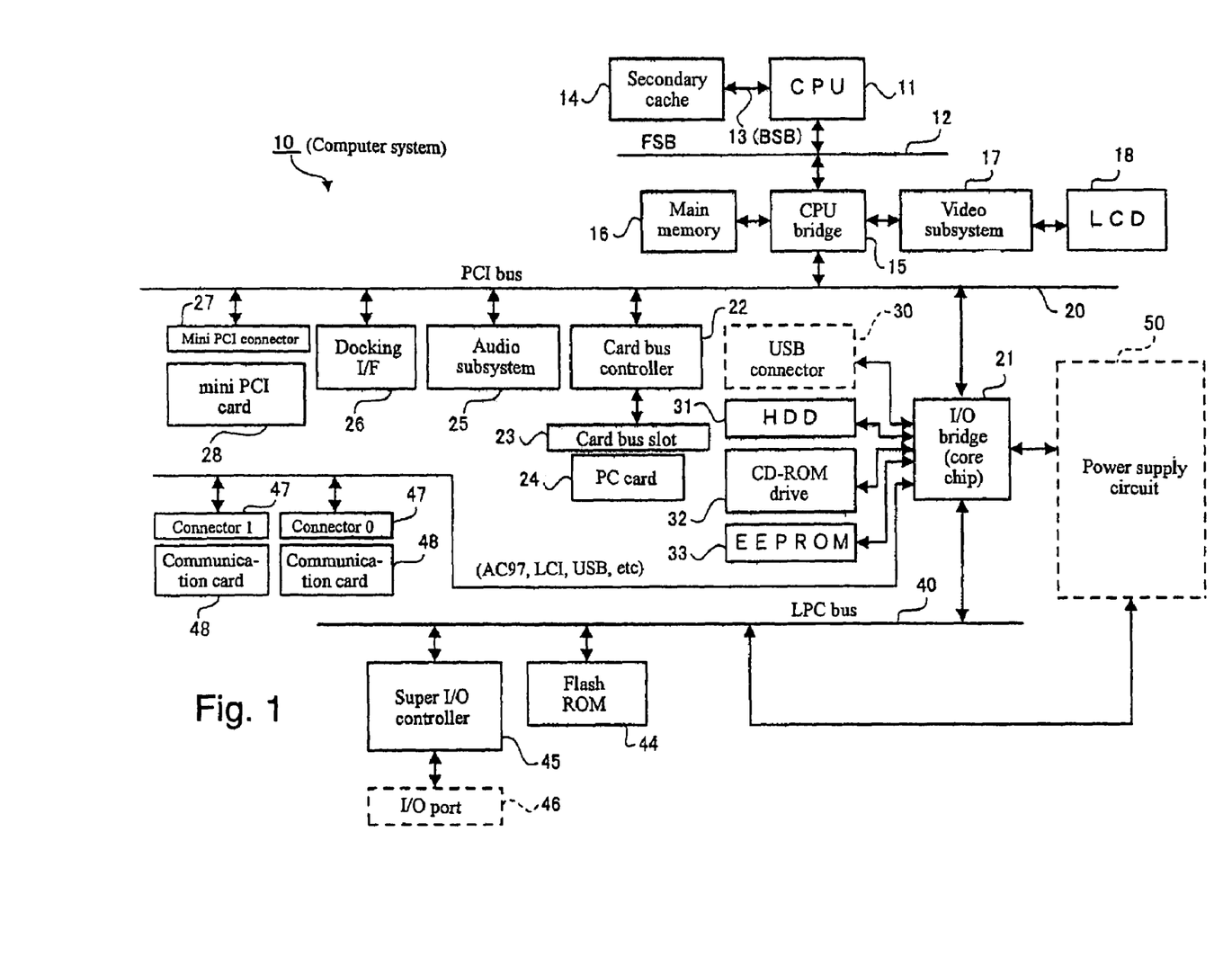
FIG. 1 shows the hardware configuration of a computer system as an electrical device to which an embodiment is applied.

FIG. 1 shows the hardware configuration of a computer system 10 as an electrical device to which the embodiment is applied. A computer comprising the computer system 10 (hereinafter sometimes called just "system") is implemented as a notebook personal computer (PC) on which a given OS (Operating System) is installed in compliance with OADG (Open Architecture Developer's Group) specification, for example.

In the computer system 10 shown in FIG. 1, a CPU 11 functions as the brain of the entire computer system 10 and executes utility programs and various other programs under the control of the OS. The CPU 11 is interconnected with each component via three-level buses, i.e., a FSB (Front Side Bus) 12 that is a system bus, a PCI (Peripheral Component Interconnect) bus 20 as a bus for high-speed I/O devices, and a LPC (Low Pin Count) bus 40 as a bus for I/O devices. The CPU 11 is designed to increase its processing speed by saving program codes and data in cache memory. A recent practice is to integrate SRAM of about 128 Kbytes as a primary cache inside the CPU 11, however, a secondary cache 14 of about 512 Kbytes to 2 Mbytes is provided to cover capacity shortage via a BSB (Back Side Bus) 13 that is a dedicated bus.

The FSB 12 and PCI 20 buses are connected by a CPU bridge (host-CPI bridge) 15 known as a memory/PCI chip. The CPU bridge 15 includes memory controller function for controlling access operation to main memory 16 and a data buffer for absorbing the difference between data transfer speeds of the FSB 12 and PCI 20 buses. The main memory 16 is writable memory utilized as a read area for executable programs for the CPU 11 or a work area to which processing data for executable programs is written. The executable programs include various application programs, the OS, various drivers for operating hardware such as peripherals, and firmware such as BIOS (Basic Input/Output System) stored in flash ROM 44.

A video subsystem 17 is a subsystem for implementing video-related functions, processing drawing instructions from the CPU 11 and outputting processed drawing information on a LC display (LCD) 18 as drawing data. The PCI bus 20 is a bus that enables relatively high-speed data transfer. To the CPI bus 20, an I/O bridge 21, Card Bus controller 22, audio subsystem 25, docking station interface (Dock I/F) 26, and miniPCI connector 27 are connected.

The Card Bus controller 22 is a dedicated controller for coupling bus signals on the PCI bus 20 directly to the interface connector (Card Bus) of the Card Bus slot 23, to which a PC card 24 can be inserted. The docking station interface 26 is hardware for connecting a docking station (not shown) that is a function extension device for the computer 10, and various hardware components connected to internal buses of the docking station are connected to the PCI bus 20 via the docking station interface 26. To the miniPCI connector 27, a miniPCI card 28 is connected.

The I/O bridge 21 has bridge function with the PCI bus 20 and LPC bus 40, DMA controller function, programmable interrupt controller (PIC) function, programmable interval timer (PIT) function, IDE (Integrated Device Electronics) interface function, USB (Universal Serial Bus) function, SMB (System Management Bus) interface function, and also includes a real time clock (RTC). To an interface that is realized by the IDE interface function, an IDE hard disk drive (HDD) 31 is connected, and also a CD-ROM drive 32 is connected by ATAPI (AT Attachment Packet Interface). The I/O bridge 21 is also provided with a USB port, which is connected with the USB connector 30. Further, EEPROM 33 is connected to the I/O bridge 21 via a SM bus. From the I/O bridge 21, a plurality of connectors 47 are connected via AC 97 (Audio CODEC '97) that supports modem function, LCI (LAN Connect Interface) that is an interface with Ethernet and included in a core chip, and USB, etc. To each of the connectors 47, communication cards 48 can be connected.

The I/O bridge 21 is connected to a power supply circuit 50, which has a characteristic configuration of the embodiment. Inside the core chip constituting the I/O bridge 21, an internal register for managing the power supply state of the computer system 10 and a logic (state machine) for managing the power supply state of the computer system 10 including the manipulation of the internal register. The logic sends and receives various signals to and from the power supply circuit 50, and with this transmission of the signals, actual state of power dispatching from the power supply circuit 50 to the computer system 10 is recognized. The power supply circuit 50 controls supply of power to the computer system 10 in accordance with directives from the logic.

The LPC bus 40 is an interface standard for connecting legacy devices to a system having no ISA bus. To the LPC bus 40, flash ROM 44 and Super I/O controller 45 are connected, and the bus 40 is also used to connect peripherals that operate at relatively low speeds such as a keyboard/mouse controller. Connected to the Super I/O controller 45 is an I/O port 46, which controls driving of a FDD, parallel input/output (PIO) of data via a parallel port, and serial input/output (SIO) of data via a serial port.

Figure 2:
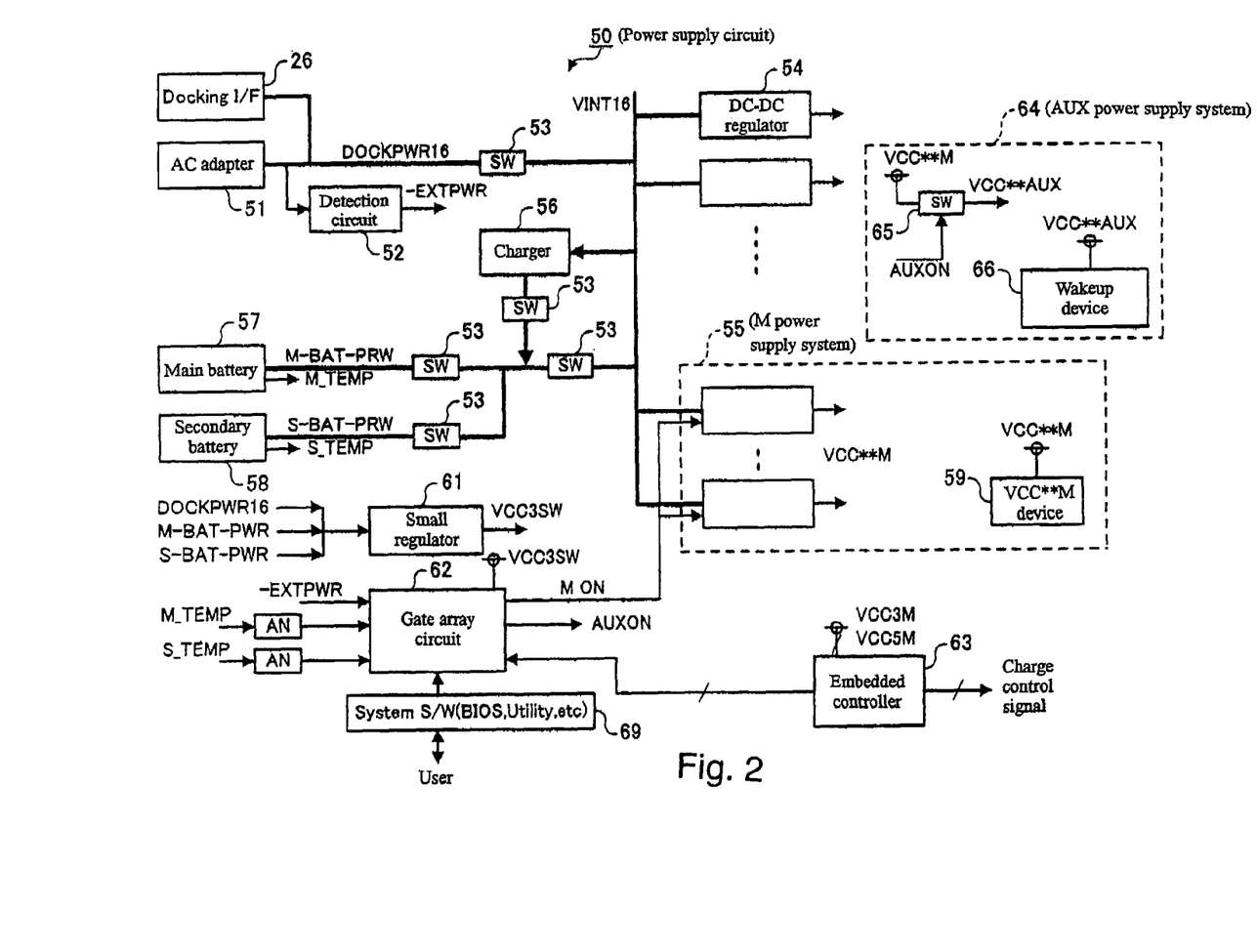
FIG. 2 shows the configuration of a power supply circuit that implements ECO shutdown function of the embodiment.

FIG. 2 shows the configuration of the power supply circuit 50 for implementing ECO shutdown function of the embodiment. Power supplies for the system include, as what is called AC power supplies that are externally provided, an AC adapter 51 for AC/DC conversion that is connected to commercial AC 100V power supply, for example, and power supply input from the docking station interface 26. As battery power supplies repeatedly used through charge and discharge, a main battery 57 and secondary battery 58 are also included. The main battery 57 comprises a number of lithium ion batteries serially connected, for example. The secondary battery 58 comprises a lithium polymer battery, for example, and is separately attached to the notebook PC externally and connected to the computer system 10 such as when the FDD or CD-ROM drive 32 of the notebook PC is removed and inserted.

The power supply circuit 50 also includes a detection circuit 52 for recognizing the presence of an AC power supply (power supply input from the AC adapter 51 and the docking station interface 26), switches (SW) 53 provided on predetermined lines responsible for switching, a plurality of DC-DC regulators 54 for generating DC constant voltage to be used by each device of the system, and a charger 56 for charging the main battery 57 and the secondary battery 58. The power supply of the system is the power supply line VINT 16 that is the supply source for the various DC-DC regulators 54 and the charger 56 of the system via switches 53 necessary for switching.

The DC-DC regulators 54 supply power of different voltages into the system depending on various voltages and systems of ON/OFF control in various power states within the system. The DC-DC regulators 54 have a group of power supplies called M power supply system 55 that is turned ON to realize wakeup function and battery charging function when the system is powered off and an AC power supply is present. The power supply line for the M power supply system 55 can be called "VCCM" such as VCC5M and VCC3M depending on voltages. A VCCM device 59 operates with supply of VCC**M. Within the system, devices that need multiple power supply voltages exist. To turn on the power supply line, it may be necessary to turn it on/off with relevant power supplies of multiple voltages synchronized. The M power supply system 55 is also comprised of power supplies of multiple voltages for that reason, and the system includes a group of power supplies of voltages 5V, 3.3V, 1.8V, 1.5V, and 1.2V and so on.

Further, the power supply circuit 50 to which the embodiment is applied has a small regulator 61 for providing power to a circuit that turns on the system when either an AC power supply or a battery (the main battery 57 and/or secondary battery 58) is present while the system is powered off, a gate array circuit 62 that is an integrated circuit (ASIC) controlling power-on/off sequence such as ON/OFF control of the M power supply system 55 and control of auxiliary power supply system (AUX power supply system), an embedded controller 63 partly responsible for power supply management together with the gate array circuit 62 by means of a power management controller (PMC) internally included therein, and an AUX power supply system 64 that is power supply for the wakeup device 66 responsible for waking up the system, for example. Various settings and the like for the power supply circuit 50 by the user are made via system software 69 comprised of BIOS and utilities. The embedded controller 63 communicates with the main battery 57 and secondary battery 58, which are intelligent batteries having a CPU internally, in compliance with SBS (Smart Battery System), for example.

The AUX power supply system 64 can be controlled ON/OFF based on setting by the gate array circuit 62 from the M power supply system 55 via a load switch circuit 65 such as FET, and includes 3.3V, 1.8V, and 1.5V, for example. When the system is powered off and no AC power supply such as the AC adapter 51 but only a battery (the main battery 57 and/or the secondary battery 58) is present, neither wakeup function by WakeOnLAN (performing wakeup via a LAN while the system is powered off), for example, by the wake-up device 66 nor battery charging function need to be supported, thus the M power supply system 55 is also turned off. If either an AC power supply or a battery is present, a small amount of power supply (VCC3SW: 3.3V) supplied to a circuit for powering the system on is provided to the powered-off system by the small regulator 61, in addition to the M power supply system 55. As mentioned above, wakeup function is a function of turning on the power supply of a computer with its system powered off with a remote operation to start up the system, allowing a system to be turned on with a directive from a network based on an operation at a remote place instead of an operator manually turning it on.

In the computer system 10 to which the embodiment is applied, a "soft-off" state exists in which conditions that were set for the core logic at the previous shutdown are preserved and the system can be woken up with a RTC timer and the like. In addition, a corresponding "mechanical-off" state exists in which either the core logic is in a default state (in which the computer system is connected to the AC adapter 51 and docking station interface 26, and thus an AC power supply exists) or power is not supplied (an AC power supply does not exist). WakeOnLAN, a representative wakeup function, is basically designed to be used as a part of office facility and thus intended only for cases an AC power supply exists, capable to wake up a system from either of the above-mentioned off states when an AC power supply exists. On the other hand, wakeup from Bluetooth, which is another wakeup function, assumes that the system is in a mobile environment since Bluetooth is wireless communication, and thus has a mechanism that wakes up the system with a battery when the system is turned off.

Figure 3:
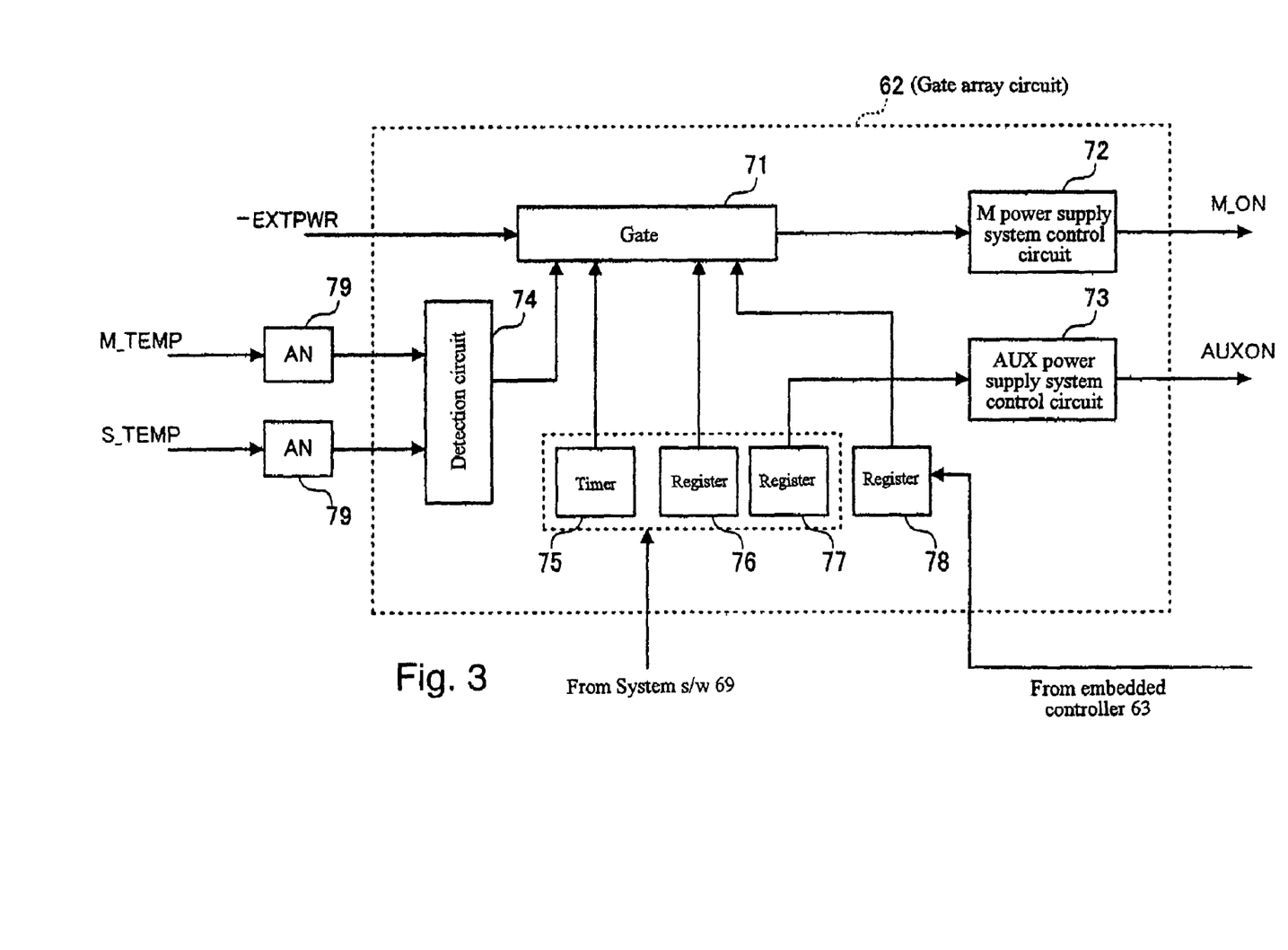
FIG. 3 illustrates a gate array circuit with more detail.

FIG. 3 illustrates the gate array circuit 62 with more detail. The gate array circuit 62 shown has a gate 71 for conveying -EXTRPWR that is a signal indicating the presence of an AC power supply as it is or masking it, a M power supply system control circuit 72 for outputting M_ON in response to ON of the -EXTPWR gate 71 to turn on the M power supply system 55, an AUX power supply system control circuit 73 for outputting AUXON to turn on the AUX power supply system 64, a detection circuit 74 for recognizing the presence of the main battery 57 and secondary battery 58, a timer 75 for monitoring time lapse, a register 76 that is an I/F for enabling the gate 71 based on information from the system software 69, a register 76 that is an I/F for conveying information from the system software 69 to the AUX power supply system control circuit 73, a register 77 as an I/F for conveying information from the system software 69 to the AUX power supply system control circuit 73, and a register 78 as an I/F for enabling the function of the gate 71 from the embedded controller 63. Since TEMP terminals (M_TEMP and S_TEMP) used for checking the presence of a battery are analog signals, ANs 79 that are circuits for digitalizing the signals through a comparator is provided at the previous step of the gate array circuit 62 as necessary.

A function to reduce power consumption (ECO shutdown function) during shutdown (system power-off) to which the embodiment is applied will be described. "Shutdown" refers to operation of terminating an OS and turning off the system unit, however, is used herein interchangeably with "system power-off".

In a normal state in which the ECO shutdown function is not applied, when the system is powered off and there is an AC power supply, output from the M power supply system 55 and VCC3SW that is output from the small regulator 61 are ON and power consumed by the system logic is about 100 to 120 mW. For example, if an Ethernet controller as an example of wakeup device 66 performs WakeOnLAN, power consumption of 300 to 400 mW is added, resulting in about 500 mW for the entire system. Power consumption including that for the AC adapter 51 is about 1500 mW. When the system is powered off with no AC power supply but only a battery source, only the VCC3SW from the small regulator 61 is ON, and power consumption is reduced to 5 mW or less. Power consumption including that for the AC adapter 51 is about 400 mW or less.

A typical system is designed to unconditionally turn on the M power supply system 55 when an AC power supply is present. In recent years, due to increased number of power supply voltages and addition of wakeup function, power consumed when the M power supply system 55 is ON tends to increase. This is because the wakeup device 66 is added to the embedded controller 63 which is a circuit controlling battery charging, and further, there are loss by the DC-DC regulators 54 in regard to multiple voltages and loss by the VCCM device 59 that is unnecessarily turned on for the M power supply system 55. The VCCM device 59 that is unnecessarily turned on is a device that need not necessarily to be turned on while the system is powered off.

The embodiment therefore places the system into a state similar to a power-off state with a battery by turning off the M power supply system 55 when wakeup function and battery charging are not required even if an AC power supply exists. This can reduce standby power by about 300 to 100 mW.

Realization of the ability to turn off the M power supply system 55 during system shutdown when an AC power supply exists requires the following:

(1) A capability of turning off the M power supply system 55 depending on settings even if an AC power supply is present (2) A capability of turning off wakeup function depending on settings (3) A capability of preserving battery charging function during system power-off even when a charging control circuit is turned off (4) Software for controlling these capabilities (such as BIOS, utilities, setup for the system)

The above-mentioned "(1) A capability of turning off the M power supply system 55 depending on settings even if an AC power supply is present" can be realized by designing the gate 71 for the detection signal -EXTPWR indicating an AC power supply outputted from the detection circuit 52 such that ON/OFF of the M power supply system 55 can be controlled from the M power supply system control circuit 72 according to the setting of the system software 69 (via the register 76), as illustrated by the gate array circuit 62 in FIG. 3. Typically, the detection signal -EXTPWR for an AC power supply is a condition for turning on the M power supply system 55, and the embodiment adds a circuit to turn this signal ON/OFF based on settings of software.

The above "(2) A capability of turning off wakeup function depending on settings" could be realized with a user interface that can be set in terms of standby power during system power-off. More specifically, as shown in the gate array circuit 62 in FIG. 3, the AUXON output from the AUX power supply system control circuit 73 should be controlled via the register 76 according to the setting of the system software 69.

For "(3) A capability of preserving battery charging function during system power-off even when a charging control circuit is turned off", to be more specific, it is preferred to provide capabilities described below so as to maintain charging function while the system is powered off.

As a first capability to maintain charging function, a function can be provided that can maintain the M power supply system 55 until charging is complete and turn off the M power supply system 55 after charging is complete while the system is powered off. This can be realized, for example, by providing an I/F between the embedded controller 63 that conducts charging and the gate array 62, and adding the register 78 for enabling the -EXTPWR gate function implemented by the gate 71. That is, the function can be realized by adding a register for turning off from the embedded controller 63 having a serial I/F, and turning off the charging logic when charging is complete.

In addition, as a second capability to maintain charging function, such a capability can be provided that can turn on the M power supply system 55 when the attachment of an AC power supply is detected such as when the AC adapter 51 is inserted while the system is powered off. With this function, requirement of charge is determined when an AC power supply such as the AC adapter 51 is inserted after power-off state, the M power supply system 55 is turned on and the battery is charged as needed, and the M power supply system 55 is turned off after the charging is completed. This can be realized by adding a feature to detect shift from -EXTPWR inactive to active and turn on the gate 71 for -EXTPWR within the gate array circuit 62.

As a third capability to maintain charging function, such a capability can be provided that can turn on the M power supply system 55 when the attachment of a battery is detected during system power-off. That is, the function determines whether charging is necessary when the main battery 57 or the secondary battery 58 requiring charging is attached, charges the battery as necessary, and turns off the M power supply system 55 after charging. This function can be realized by detecting the state of TEMP terminals (M_TEMP and S_TEMP) used for checking the presence of a battery at the detection circuit 74 in the gate array circuit 62, and turning ON/OFF the -EXTPWR gate 71 that is the input from the gate array circuit 62.

Further, as a fourth capability to maintain charging function, such a capability can be provided that can turn on the M power supply system 55 after a predetermined time period has passed during system power-off. With this feature, when the capacity of the battery (the main battery 57 or the secondary battery 58) has dropped to a level that requires charging due to self-discharge such as when the system has been powered off for an extended time period, the state is detected and the battery is charged as required, and the M power supply system 55 is turned off after the charging. This can be realized by adding a feature to turn on the -EXTPWR gate 71 after a predetermined time period has been counted (has expired) by the timer 75 provided in the gate array circuit 62.

These first to fourth capabilities can exist as independent functions. With all of these functions, it is possible to realize the function to turn off the charging circuit such as the charger 56 when it is not in operation virtually without losing charging function while the system is powered off. Here, the charging circuit includes components that are used for charging the embedded controller 63 and the like in addition to the charger 56.

Turning to the "(4) software for controlling these capabilities", an I/F that can be set by the user so as to reduce power consumption during power-off is provided. The user's setting is preserved in non-volatile memory, and the functions (1) to (3) are utilized depending on the value. Software is prepared for controlling the turning off of the M power supply system 55 during power-off when there is an AC power supply. This can be realized by adding the feature to BIOS and set-up utilities as the system software 69 shown in FIG. 2.

Figure 4:
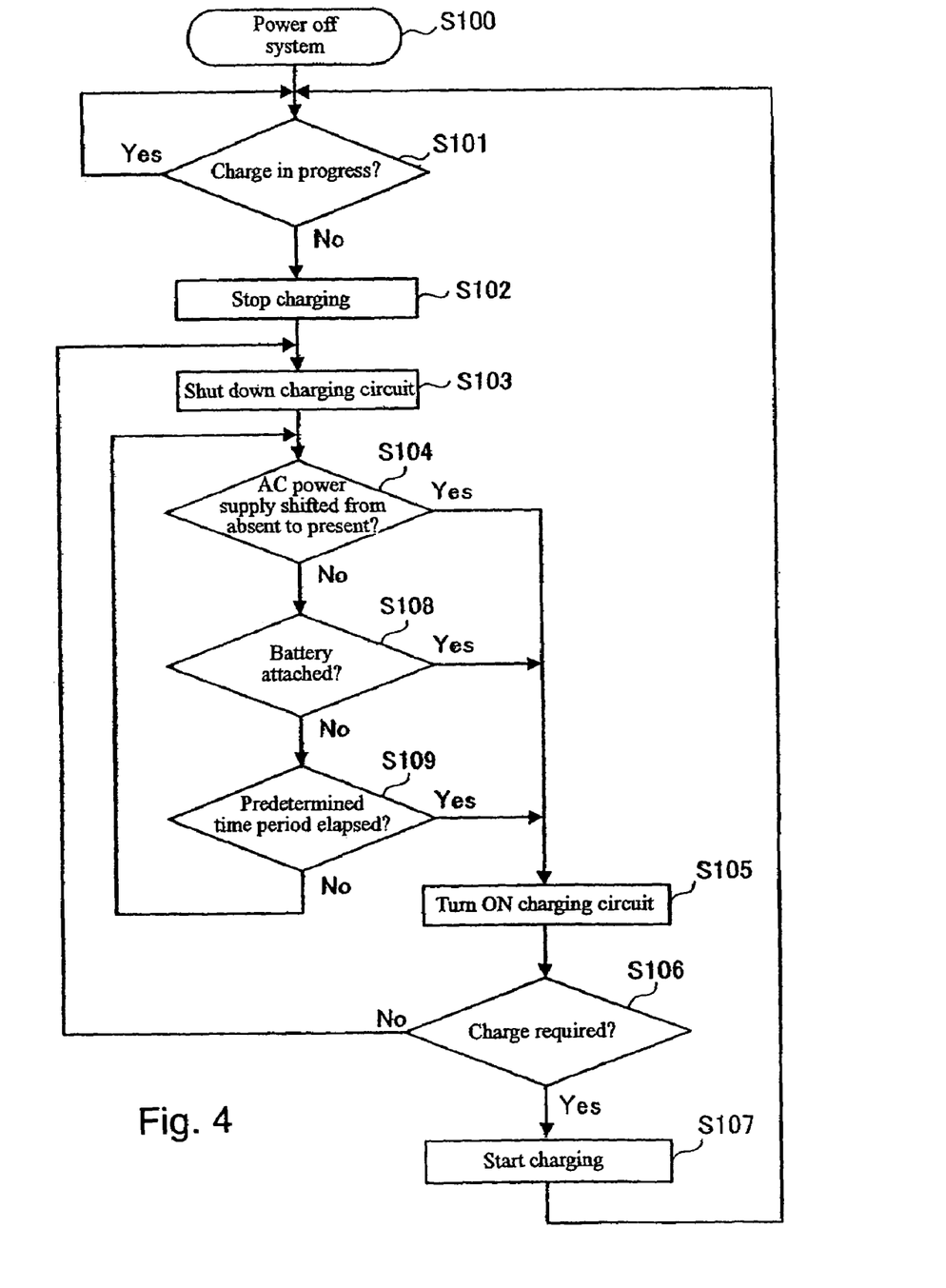
FIG. 4 is a flowchart illustrating processing for realizing the feature to preserve charging function during system power-off even if the charging control circuit is turned off.

FIG. 4 is a flowchart illustrating the processing for realizing "(3) a capability of preserving battery charging function while the system is powered off even when a charging control circuit is turned off". When the system is powered off (step 100), the embedded controller 63 first determines where charging is being performed or not (step 101). If charging is being performed, the processing at step 101 is continued, and if charging is not being performed, charging function is shut down (step 102), and the M power supply system 55 is turned off by the gate array circuit 62 to shut down the charging circuit such as the charger 56 (step 103).

Then, with the output from the detection circuit 52, it is determined whether or not an AC power supply (the AC adapter 51 and docking station interface 26) has shifted from being absent to present, that is, whether it has been inserted after not being connected (step 104). Shift of -EXTPWR from inactive to active causes M_ON to be outputted from the gate array circuit 62, which turns on the M power supply system 55 and the charging circuit (step 105). Then, it is determined whether charging is required or not with charge state of the main battery 57 or the secondary battery 58 (Step 106), and if charging is not required, the process returns to step 103 to shut down the charging circuit, and if charging is required, charging is started (step 107) and the process returns to step 101.

If, at step 104, the AC power supply has not shifted from being absent to present, it is determined whether a battery (the main battery 57 or secondary battery 58) has been attached or not (step 108). If a battery is attached, the processing at step 105 and the subsequent steps are executed to turn on the charging circuit. If a battery is not attached, it is determined whether the timer 75 has expired, that is, a predetermined time period has elapsed or not (step 109), and if a predetermined time has elapsed, the step 105 and the subsequent steps are executed to turn on the charging circuit. If a predetermined time period has not elapsed, the process returns to step 104. In this way, processing for preserving charging function during power-off even if the charging circuit is turned off is carried out.

A user interface of the embodiment will be now described.

In this embodiment, an OS as basic software executed by the CPU 11, and a BIOS that is a program controlling various devices relating to power management (PM) and the like are prepared as software. In the computer system 10, the I/O bridge 21, which is a core chip, is provided with a power management control register for power management and CMOS that is non-volatile memory. When the system is powered off, a directive "to enter a shutdown (system power-off) state" is written to the power management control register by the OS, and the BIOS can operate according to a signal from the power management control register based on the write. The CMOS stores various setting information from the BIOS.

Figure 5:
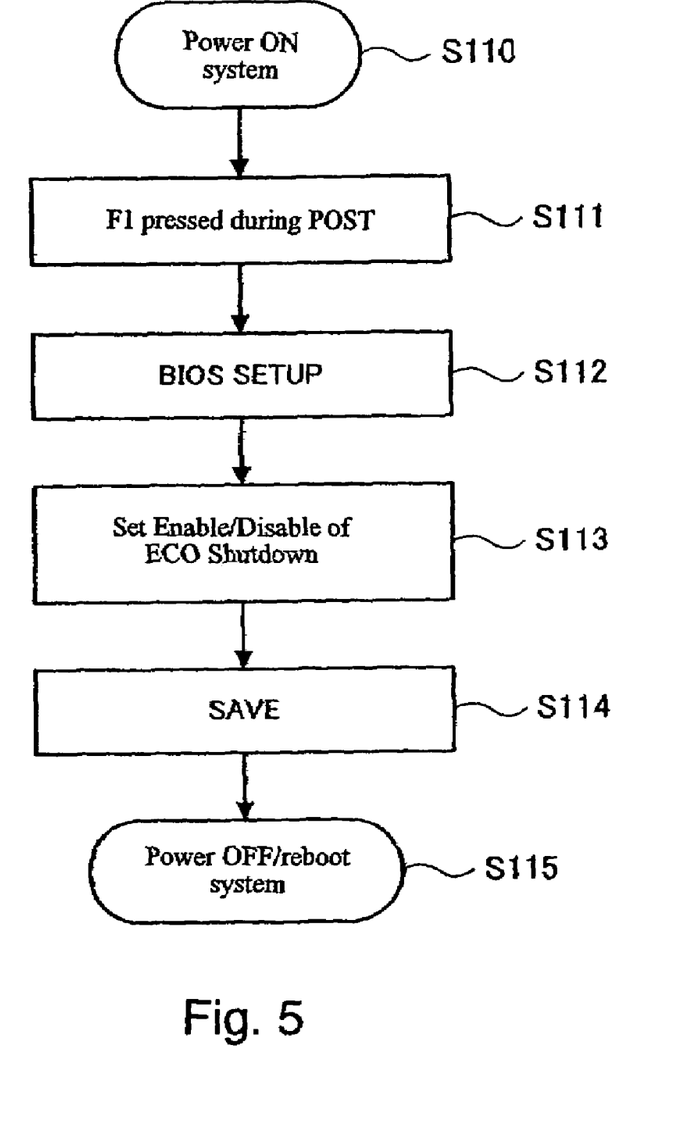
FIG. 5 is a flowchart illustrating the flow of setting CMOS.

FIG. 5 is a flowchart illustrating the flow of setting the CMOS. First, when the system is powered on (step 110) and the F1 key is pressed by the user during POST (Power On Self Test) (step 111), a "BIOS SETUP" program contained in the BIOS for changing CMOS setting is invoked (step 112). Within a menu of the program, setting to "enable/disable ECO shutdown function" can be made (step 113). Pressing a key for saving the user's setting saves the setting in the CMOS (step 114). Subsequently, the user can power off or reboot the system (step 115), and the system will operate based on the new setting. In this manner, use/disuse of power consumption reducing function while the system is powered off can be set by utilizing an area in the CMOS in this embodiment.

As described above, the embodiment provides mode setting for while the system is shut down as one entry of the menu for EasySetup of the BIOS. Depending on the degree of power reduction, settings of multiple levels or individual settings as shown below may be provided.

(A) Charging function when there is an AC power supply
(B) A wakeup function that consumes especially large amount of power. Specifically, WakeOnLAN function using ACC**AUX system
(C) All of other wakeup functions. Specifically, wakeup from a USB device, wakeup from soft-off with a system timer, etc.

The embodiment is characterized in that it controls a system while it is shut down based on user interface setting rather than wakeup function setting.

Figure 6:
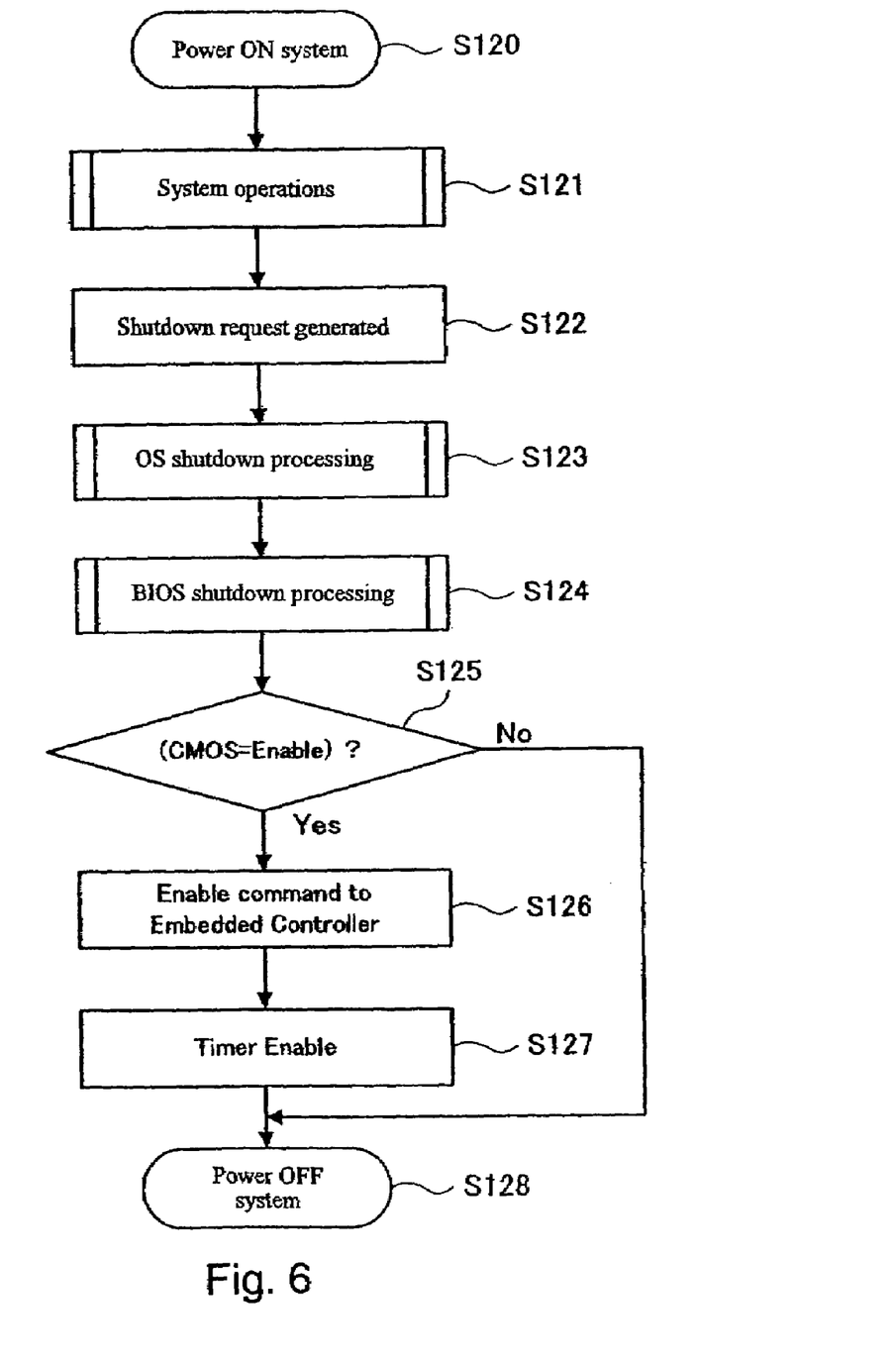

FIG. 6 is a flowchart illustrating shutdown processing executed by the BIOS and the like. When the system is powered on (step 120), the CPU 11 performs various operations for the system in response (step 121). Then, via the BIOS, the OS executed by the CPU 11 recognizes generation of a shutdown request such as the user selecting a shutdown menu included by the OS (step 122), and shutdown processing by the OS is executed (step 123). More specifically, HAL (Hardware Abstraction Layer) of the OS writes SHUTDOWN to the power management control register. In response to the writing operation, the power management control register outputs SMI (System Management Interrupt). In this embodiment, the logic (south bridge) of the system is equipped with capability of outputting a SMI request that results from writing to the power management control register, which capability is used here.

Subsequently, processing of a handler in the SMI by the power management control register is called, and shutdown processing of the BIOS is performed (step 124). The shutdown processing determines whether the CMOS is enabled or not (step 125). If the CMOS is not enabled, the system is powered off and the processing terminates (step 128). If the CMOS is ENABLE, an ENABLE command is output to the embedded controller 63 (step 126). Then, the timer 75 is enabled (step 127), and the system is powered off and the processing is terminated (step 128).

Here, in many cases power-off is performed, a system is transitioned to a state called "mechanical-off" not only with writing to the power management control register but with other ways. The system may be powered off with writing to the power management control register, which is a state called "soft-off". This soft-off is used in limited cases such as where an OS such as Microsoft's Windows2000 and WindowsXP in compliance with ACPI (Advanced Configuration and Power Interface), which is a power control interface, transitions the system into hibernation (S4), or where an OS such as Windows95 and Windows98SE in compliance with APM (Advanced Power Management), which is a power saving standard, transitions the system into hibernation with the system connected to a docking station. "Windows" is a trademark.

While the description with FIG. 6 described processing for ACPI, processing for APM will be as follows. After the user has performed shutdown operation such as selecting a shutdown menu in the OS at step 122 shown in FIG. 6, a power-off event for APM calls processing of each device driver and BIOS in shutdown processing for the OS at step 123. Then, in shutdown processing of the BIOS at step 124, defined processing is called from a table that defines processing at shutdown. By defining processing according to the embodiment into the processing to be called, processing at step 125 and the subsequent steps in FIG. 6 described earlier are called. Then, when all processing is completed, the BIOS writes the value for shutdown to the power management control register and performs power-off at step 128.

Figure 7A:
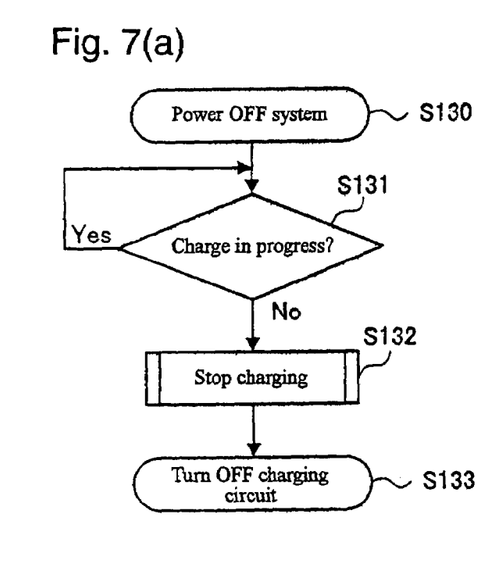
FIGS. 7(a) and (b) illustrate processing performed by an embedded controller during shutdown.

FIGS. 7(a) and (b) illustrate processing during shutdown by the embedded controller 63. As FIG. 7(a) shows, when the system is powered off (step 130), it is determined in the embedded controller 63 whether the battery (the main battery 57 or the secondary battery 58) is being charged or not (step 131). If the battery is being charged, the determination is continued, and if the battery is not being charged, halt processing of charging is executed (step 132) and the charging circuit such as the charger 56 is turned off (step 133).

Figure 7B:
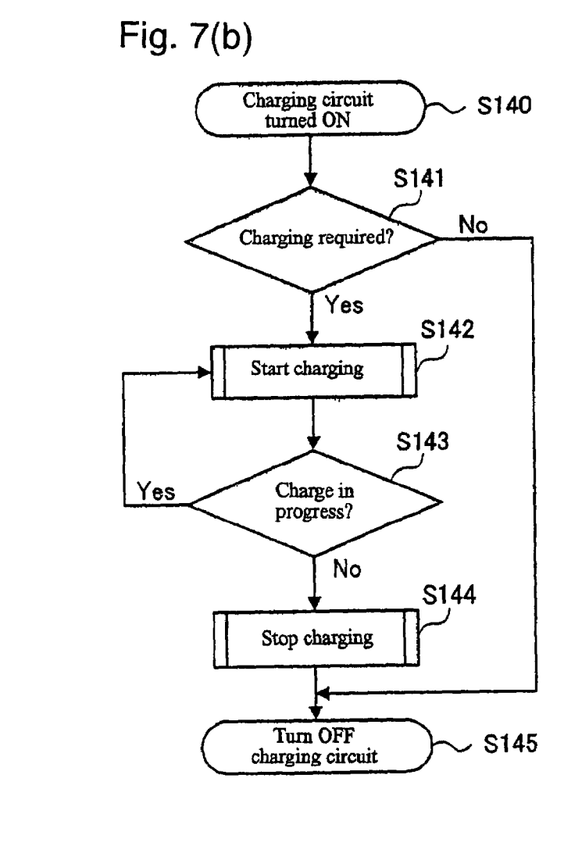

On the other hand, as shown in FIG. 7(b), if the charging circuit is turned on (step 140), the embedded controller 63 determines whether the battery (the main battery 57 or secondary battery 58) requires charging or not (step 141). If charging is not needed, the charging circuit is turned off (step 145) and the process terminates. If charging is required, charging by the charger 56 is started (step 142). Subsequently, the embedded controller 63 determines if the battery is being charged or not (step 143). If the battery is being charged, the determination continues, and if the battery is not being charged, halt processing of charging is performed (step 144), which turns off the charging circuit such as the charger 56 (step 145) and the process terminates.

Figure 8:
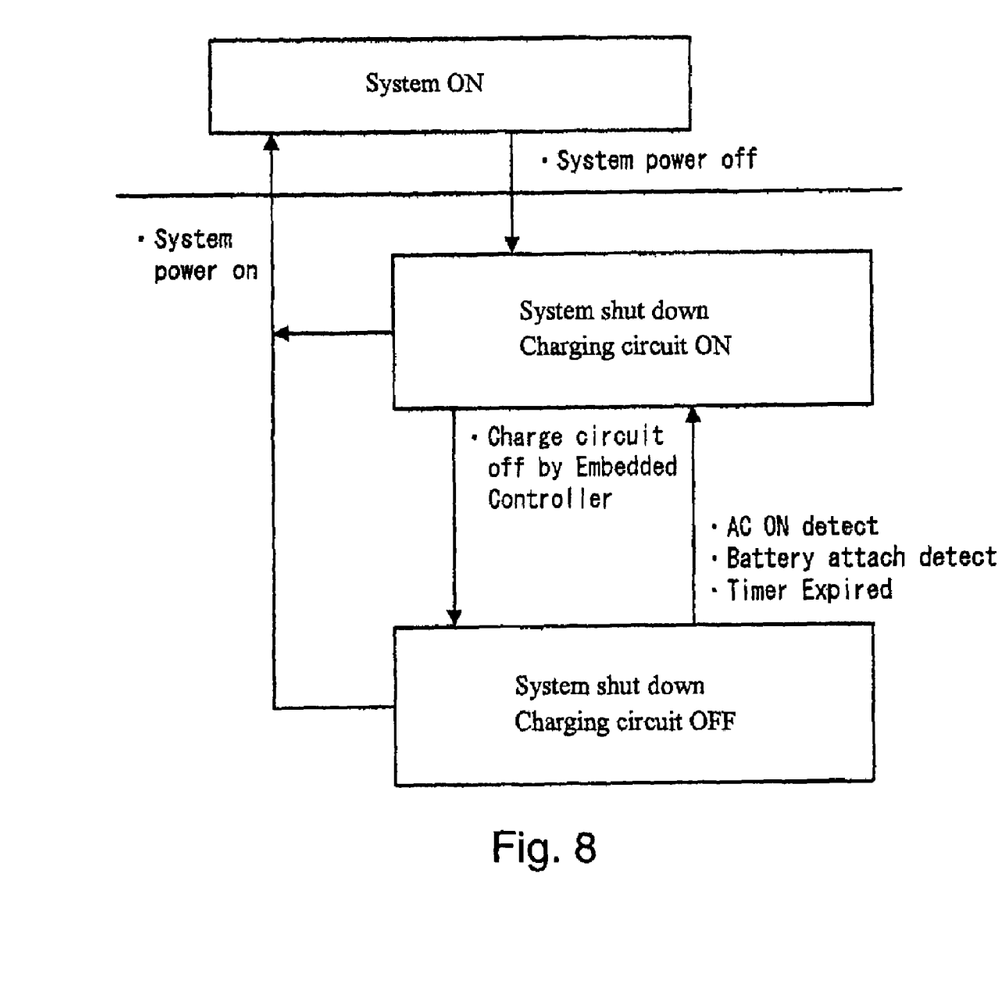
FIG. 8 is a state transition diagram showing hardware operation while the system is shut down.

FIG. 8 is a state transition diagram illustrating hardware operation while the system is shut down (powered off). First, in a SYSTEM ON state in which the system is powered on, if powering off operation to the system as described above is conducted, the hardware transitions to a state in which system is shut down and the charging circuit is on. Then, when the charging circuit is turned off in accordance with the embedded controller 63, the hardware transitions to a state in which the system is shut down and the charging circuit is off. From the state where system is shut down and the charging circuit is off, the hardware transitions to a state in which the system is shut down and the charging circuit is on in response to events of confirmation of AC power supply insertion, confirmation of battery connection, and elapse of a predetermined time period. Also, from the state in which the system is shut down and the charging circuit is off and the state in which the system is shut down and the charging circuit is on, the hardware transitions to the SYSTEM ON state when powering on operation to the system is performed.

As thus far described, in the embodiment, a charging logic can be turned off in system shutdown state with an AC power supply present. That is, normally, the embedded controller 63 and peripheral circuitry are in an active state as logic for charging when the system is shut down and an AC power supply is present. Accordingly, the DC-DC regulators 54 (M power supply system 55) are ON that supplies 3.3V and 5V, which are main voltages in the system. This control is performed such that when -EXTPWR that is a detection signal of an external power supply is active, the gate array circuit 62, the ASIC for the system, operates the DC-DC regulators 54 for the M power supply system 55 with V3 ON and V5 ON, and the embedded controller 63 can perform charging operation. In the embodiment, even if an AC power supply exists, the system can be brought into a state similar to shutdown state with only a battery present. Power consumed by the system in this case is several mW, which means significant reduction of power consumption compared to 80 to 120 mW in normal cases.

The feature is useful for users who do not need battery charging or can get enough power from charging while the system is on and suspended such as those who use a notebook PC mainly as a replacement for a desktop PC. Also, if both charging function and wakeup function can be turned off, power consumed during shutdown state of about 1.1 to 1.5W for the AC adapter 51 plus the system in conventional cases can be reduced to no load power on the AC adapter 51.

In the drawings and specifications there has been set forth a preferred embodiment of the invention and, although specific terms are used, the description thus given uses terminology in a generic and descriptive sense only and not for purposes of limitation.

What is claimed is:

1. A computer system, comprising:
   an AC power supply operatively connected to said computer system for supplying power to said computer system;
   a battery operatively connected to said computer system for supplying power to said computer system when necessary;
   a circuit operatively connected to said battery and said AC power supply, wherein said circuit turns off a charging function to said battery while said battery is still connected to said AC power supply during said computer system being powered off; and
   a user interface for a user to set said charging function when computer system is in a power-off state, wherein said circuit turns off said charging function to said battery based on information set in said user interface.

2. The computer system according to claim 1, wherein said circuit turns off said charging function to said battery after charging has been completed during said computer system being powered off.

3. The computer system according to claim 1, wherein said circuit turns on said charging function to said battery if said AC power supply has changed from not being connected to being connected to said computer system during said computer system being powered off.

4. The computer system according to claim 1, wherein said circuit turns on said charging function when a battery previously not connected is connected to said computer system during said computer system being powered off.

5. The computer system according to claim 1, wherein said circuit turns on said charging function to a battery after a predetermined time period has lapsed since said charging function to said battery was turned off.

6. The computer system according to claim 1, wherein said computer system further includes a regulator operatively connected to said circuit for supplying a small amount of power to said circuit.

7. A computer readable medium having a computer program product for providing power management in a computer system, said computer readable medium comprising:
   computer program code for determining whether or not a battery connected to a computer system is being charged by an AC power supply when said computer system is powered off;
   computer program code for, in response to said battery connected to said computer system not being charged by said AC power supply, turning off a charging circuit for charging said battery even when said battery remains to be connected to said AC power supply; and
   computer program code for generating a user interface for a user to set said charging function when computer system is in a power-off state, wherein said circuit turns off said charging circuit for charging said battery based on information set in said user interface.

8. The computer readable medium according to claim 7, wherein said computer readable medium further includes computer program code for turning on a power supply for supplying power to said charging circuit when said AC power supply is connected to said computer system after not being connected to said computer system.

9. The computer readable medium according to claim 7, wherein said computer readable medium further includes computer program code for turning on a power supply for supplying power to said charging circuit when a battery requiring to be charged is connected to said computer system after not being connected to said computer system.

10. The computer readable medium according to claim 7, wherein said computer readable medium further includes computer program code for turning on a power supply supplying power to said charging circuit after a predetermined time period has lapsed since said power supply was turned off.

* * * * *